C. F. BURROUGHS.
FLOAT OR VALVE REGULATOR AND METHOD OF MAKING THE SAME.
APPLICATION FILED JAN. 15, 1920.
1,396,926.  Patented Nov. 15, 1921.
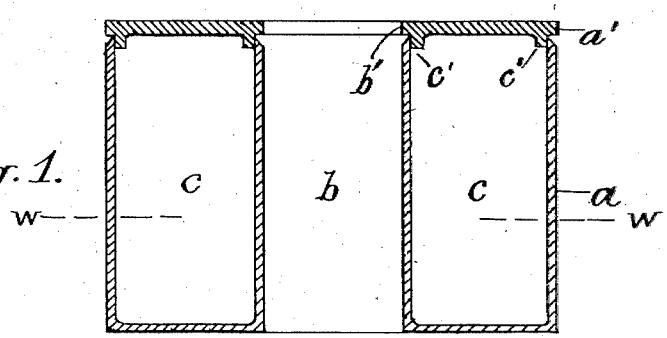
Fig. 1.
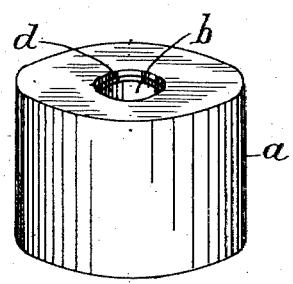
Fig. 2.
Fig. 3.
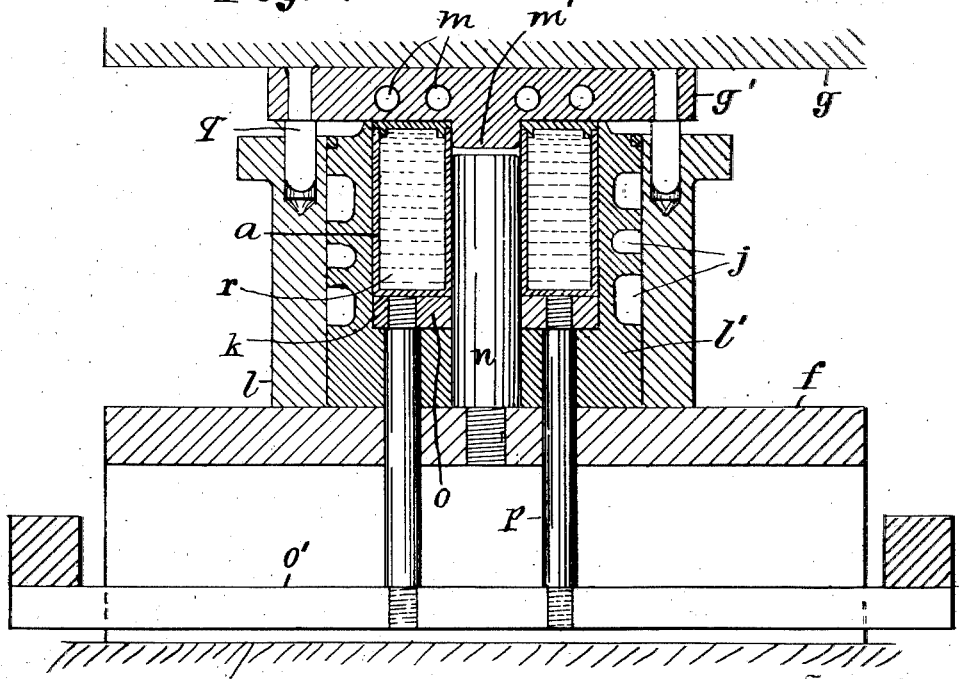
Inventor
Charles F. Burroughs
By Attorney
Thomas S. Crane

UNITED STATES PATENT OFFICE.

CHARLES F. BURROUGHS, OF EAST ORANGE, NEW JERSEY, ASSIGNOR TO COMPOSITION MACHINERY CORPORATION, OF NEWARK, NEW JERSEY, A CORPORATION OF NEW JERSEY.

FLOAT OR VALVE REGULATOR AND METHOD OF MAKING THE SAME.

1,396,926.     Specification of Letters Patent.     Patented Nov. 15, 1921.

Application filed January 15, 1920. Serial No. 351,696.

*To all whom it may concern:*

Be it known that I, CHARLES F. BURROUGHS, a citizen of the United States, residing at 122 Prospect street, East Orange, county of Essex, and State of New Jersey, have invented certain new and useful Improvements in Float or Valve Regulators and Methods of Making the Same, fully described and represented in the following specification and the accompanying drawings, forming a part of the same.

This invention relates to a float such as is used in various apparatus for regulating the movement or opening of a valve, as for instance in a carbureter for an explosion engine.

A metallic float has been commonly used in such carbureters, but is difficult to manufacture with a permanent joint where the cover is soldered on, and it therefore fails to permanently perform its function in regulating the valve connected with the float.

The present invention comprises a float having a body molded of plastic composition which is not liable to be effected by immersion in gasolene or analogous liquids.

A composition is employed that may be welded at a moderate temperature (250 degrees Fah.) and is self-hardening, when molded into any shape, after it regains the atmospheric temperature.

Such a float can be made in a few minutes by placing a charge of suitable composition, as bakelite, in a heated mold and pressing it therein to form an annular chamber which renders the float buoyant, and simultaneously molding a composition cover is then secured upon the top of the annular chamber by welding with heat, or by suitable cement, thus making the chamber air-tight and water-tight.

As the structure floats upon the liquid, it is only immersed to a small degree, and the cover and its joint are never affected by the liquid at all.

The nature of the invention will be understood by reference to the annexed drawing, in which Figure 1 is a vertical central section of a float with the edges of the walls beveled, and a cover applied thereto in readiness to cement; Fig. 2 is a perspective view of the float; and Fig. 3 is an apparatus illustrating the method of manufacture.

*a* designates the outer walls of the float-body, *b* an open channel extending through the center, as is usual in carbureter floats, thus forming an annular chamber *c*. The cover *a'* is formed as a flat ring or washer adapted to fit upon the annular chamber has annular ribs *c'* which fit between the walls of the chamber.

The beveled edges of the walls form an annular cavity to receive a suitable cement, which forms a water-tight union of the body and the cover.

A dotted line *w—w* indicates a level to which the float might, in practice, be immersed.

The body and the cover are formed separately in suitable heated molds, and the two parts are then assembled in a mold, such as is shown in Fig. 3 adapted to support the body of the float and press the cover tightly upon the same.

The mold with its cope or "force" is shown inserted between the head *g* of a hydraulic press and its platen *h*, the mold being supported upon a base-plate *f* raised above the platen sufficiently to operate an ejector *o*.

The mold *l*, *l'* is formed with a cavity *k* adapted to fit the walls *a* of the float, and is provided in the center with a plug *n* to fill the central channel *b*.

The edges of the walls of the float in this figure are shown flat, and a flat cover like that of Fig. 1 is shown fitted to the flat top of the wall, and a force *g'* is attached to the platen *g* and formed with a boss *m'* upon the center to fit within the aperture *b'* of the cover.

Passages *m* are shown in the force, which would be suitably connected to pipes to circulate hot and cold fluid.

Dowel-pins *q* upon the force are fitted to holes in the mold-body *l* to center the force thereon.

The mold is shown with a body portion *l'* in which a spiral groove *j* is formed through which hot and cold fluids may be circulated. A jacket *l* closes the spiral groove.

The pipes for supplying such fluids are omitted from the drawing.

An annular ejector *o* is shown in the bottom of the cavity *k* surrounding the plug *n*, and such ejector is mounted upon two rods *p* which at the close of the welding operation, and after the float has been cooled, are operated by a frame $o'$ to push the completed float from the mold.

To prevent the collapsing of the walls of the float, when softened by heat, during the welding operation I fill the carbureter with a heavy fixed oil $r$ which is not effected at the temperature employed. Such oil is stable at the welding temperature of the composition, and does not produce any pressure in the float. It is to be understood that the annular chamber has no connection with any source of pressure at any time during the process of manufacture, and my process thus differs from those in which steam, air, or other fluid under pressure is supplied constantly to the interior of a hollow article during a molding operation.

The tops of the walls, where contacting with the cover, are also supported during the molding operation by the ribs $c'$ which project from the cover and hold the wall-tops against the sides of the mold $l$, $l'$.

The pressure or the force upon the cover $a'$, and the rigid support given to the body, produces an integral union of the cover with the top of the body, when heated.

When the top is attached to the body of the float the oil is discharged by piercing the cover; such perforation being then sealed by cement.

It will be understood that the pressure transmitted to the oil simply operates to press the walls of the annular chamber $c$ directly against the mold and plug $n$.

Such a composition float is found to be far cheaper and more durable than any made of metal.

Having thus set forth the nature of the invention what is claimed herein is:

1. A hollow carbureter float molded of plastic composition with an annular chamber, and an annular cover of such plastic composition pressed into integral union with the upper edges of the chamber, the finished float having an open central channel upon the axis of the annular chamber, as and for the purpose set forth.

2. A hollow carbureter float molded of plastic composition with an annular chamber having an integral bottom and its walls terminated with flat or beveled edges, and a cover of such plastic composition pressed into integral union with the said edges.

3. The method of forming a carbureter float of plastic composition, which consists in separately molding a float-body with an innular chamber and an annular cover adapted to close such chamber, then filling the said chamber with an oil of stable character at the welding temperature of the composition, and assembling the two parts in a single mold, heating the two composition parts sufficiently to make them weld, and pressing the cover into integral union with the walls of the said body, the oil being sealed in the annular chamber.

In testimony whereof I have hereunto set my hand.

CHARLES F. BURROUGHS.